US010732375B2

(12) United States Patent
Zhang et al.

(10) Patent No.: US 10,732,375 B2
(45) Date of Patent: Aug. 4, 2020

(54) FIBER OPTIC CROSSOVER CABLE

(71) Applicant: Fujin Precision Industrial (Jincheng)Co.,Ltd., Jincheng (CN)

(72) Inventors: Ri-Feng Zhang, Jincheng (CN); Zhi-Ming Li, Shenzhen (CN); Yao Li, Newark, CA (US)

(73) Assignee: Fujin Precision Industrial (Jincheng) Co., Ltd., Jincheng (CN)

( * ) Notice: Subject to any disclaimer, the term of this patent is extended or adjusted under 35 U.S.C. 154(b) by 0 days.

(21) Appl. No.: 16/352,202

(22) Filed: Mar. 13, 2019

(65) Prior Publication Data
US 2019/0212515 A1    Jul. 11, 2019

(30) Foreign Application Priority Data

Feb. 19, 2019 (CN) .......................... 2019 1 0123236

(51) Int. Cl.
*G02B 6/44* (2006.01)
*G02B 6/38* (2006.01)
*G02B 6/35* (2006.01)

(52) U.S. Cl.
CPC .......... *G02B 6/4472* (2013.01); *G02B 6/3556* (2013.01); *G02B 6/3885* (2013.01); *G02B 6/441* (2013.01); *G02B 6/443* (2013.01); *G02B 6/4434* (2013.01)

(58) Field of Classification Search
CPC .. G02B 6/4472; G02B 6/3556; G02B 6/3885; G02B 6/441; G02B 6/4434; G02B 6/443; G02B 6/356
See application file for complete search history.

(56) References Cited

U.S. PATENT DOCUMENTS

| 4,223,978 | A  | * | 9/1980 | Kummer  | G02B 6/3502 |
|           |    |   |        |         | 385/22 |
| 6,842,554 | B2 | * | 1/2005 | Nishi   | H04J 14/0209 |
|           |    |   |        |         | 385/17 |
| 9,008,484 | B2 | * | 4/2015 | Takeuchi | G02B 6/3508 |
|           |    |   |        |         | 385/136 |
| 9,575,259 | B2 | * | 2/2017 | Frisken | G02B 6/356 |

FOREIGN PATENT DOCUMENTS

| CN | 1357774 A | 7/2002 |
|----|-----------|--------|
| CN | 105474063 A | 4/2016 |
| CN | 107765378 A | 3/2018 |
| EP | 1415186 B1 | 5/2005 |
| WO | 2018/098324 A1 | 5/2018 |

* cited by examiner

*Primary Examiner* — John Bedtelyon
(74) *Attorney, Agent, or Firm* — ScienBiziP, P.C.

(57) ABSTRACT

A fiber optic crossover cable includes a first cable portion, a second cable portion, a crossover distribution unit, and fiber optic subunits. The first cable portion includes an M number of first cable units. Each of the M number of first cable units includes an N number of the fiber optic subunits. The second cable portion includes an N number of second cable units. Each of the N number of second cable units includes an M number of the fiber optic subunits. The M number of first cable units and the N number of second cable units are arranged in the crossover distribution unit. The N number of fiber optic subunits respectively extend to the N number of second cable units. The M number of fiber optic subunits respectively extend to the M number of first cable units.

18 Claims, 14 Drawing Sheets

FIBER OPTIC CROSSOVER CABLE

FIELD

The subject matter herein generally relates to fiber optics, and more particularly to a fiber optic crossover cable for coupling a plurality of fiber optic subunits of a plurality of switches.

BACKGROUND

In telecommunications networks, signals are often transmitted from an input switch to multiple output switches, such as in data centers. Currently, switching cabinets are generally used to enable mutual communication among data center switches. However, an adapter cabinet of the related art includes two fiber optic connection backplanes, each of which is provided with a fiber connector, so that two switches can be connected through two fiber connectors. An improved adapter cabinet includes a fiber optic connection backplane with fiber optic connectors on the fiber optic backplane such that the two switches can be connected by one fiber optic connector. However, the above described adapter cabinets may experience large connection loss and require many components, which increases cost.

BRIEF DESCRIPTION OF THE DRAWINGS

Implementations of the present disclosure will now be described, by way of embodiments, with reference to the attached figures.

DETAILED DESCRIPTION

Figure 1:
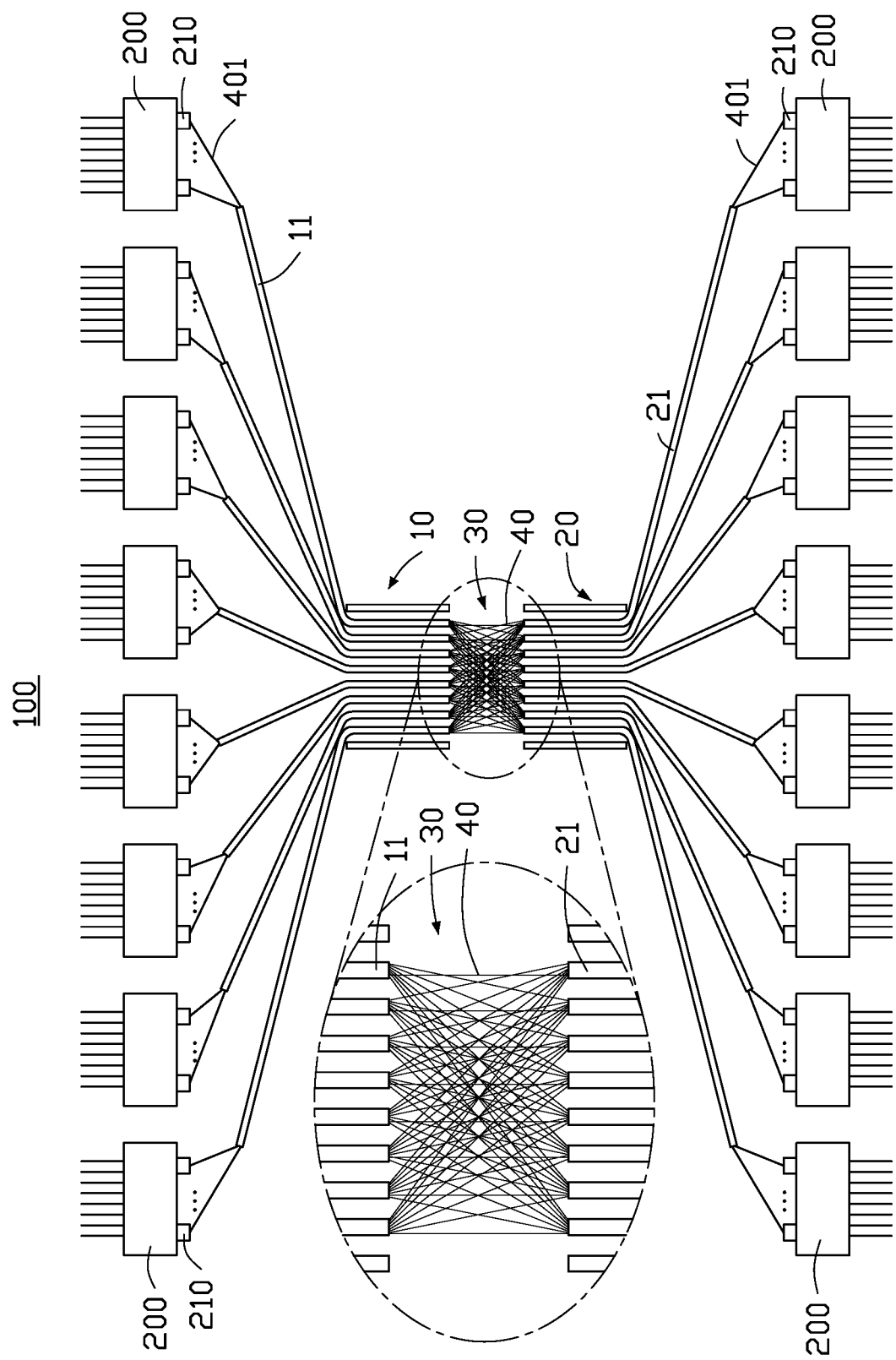
FIG. 1 is a diagram of a first embodiment of a fiber optic crossover cable.

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape, or other word that "substantially" modifies, such that the component need not be exact. For example, "substantially cylindrical" means that the object resembles a cylinder, but can have one or more deviations from a true cylinder. The term "comprising" means "including, but not necessarily limited to"; it specifically indicates open-ended inclusion or membership in a so-described combination, group, series and the like.

FIG. 1 shows a first embodiment of a fiber optic crossover cable 100 for communication among a plurality of switches 200. In one embodiment, the fiber optic crossover cable 100 can establish communication between a first switch group and the second switch group. The first switch group and the second switch group respectively include a plurality of switches 200, each of which includes one or more ports 210.

The fiber optic crossover cable 100 includes a first cable portion 10, a second cable portion 20, and a crossover distribution unit 30 disposed between the first cable portion 10 and the second cable portion 20. The first cable portion 10 and the second cable portion 20 are respectively arranged at opposite sides of the fiber optic crossover cable 100.

The fiber optic crossover cable 100 further includes a plurality of fiber optic subunits 40 that extend in the first cable portion 10, the crossover distribution unit 30, and the second cable portion 20. Each fiber optic subunit 40 includes at least one optical fiber.

Two ends of each fiber optic subunit 40 extend in the first cable portion 10 and the second cable portion 20, respectively. Each fiber optic subunit 40 includes two opposite end portions 401. Each end portion 401 is coupled to a corresponding port 210 of one of the switches 200 by a joint connector. A joint connector type may be MPO, MT, LC, or other joint connector type known in the art, but is not limited thereto. A number of the fiber optic subunits 40 is M*N. In one embodiment, both M and N are integers greater than or equal to 1, and M and N may be equal or unequal.

The first cable portion 10 includes an M number of first cable units 11, and each of the first cable units 11 bundles together an N number of fiber optic subunits 40. Each of the first cable units 11 is configured to couple to the ports 210 of one corresponding switch 200. Therefore, the first cable portion 10 is coupled to an M number of switches 200.

The second cable portion 20 includes an N number of second cable units 21, and each of the second cable units 21 bundles together an M number of fiber optic subunits 40. Each of the second cable units 21 is configured to couple to the ports 210 of one corresponding switch 200. Therefore, the second cable portion 20 is coupled to an N number of switches 200.

It can be understood that the first cable portion 10, the second cable portion 20, the first cable units 11, the second cable units 21, and the fiber optic subunits 40 can each be bound by a corresponding jacket (not shown).

The first cable portion 10 and the second cable portion 20 extend to the crossover distribution unit 30, and a plurality of fiber optic subunits 40 extend from the first cable portion 10 and the second cable portion 20. The plurality of fiber optic subunits 40 are arranged in the crossover distribution unit 30 such that the N number of fiber optic subunits 40 of each of the first cable units 11 respectively extend into the N number of second cable units 21, and the M number of fiber optic subunits 40 of each of the second cable units 21 respectively extend into the M number of first cable units 11. In other words, the plurality of fiber optic subunits 40 of the first cable units 11 in the first cable portion 10 are bundled into the plurality of second cable units 21 of the second cable portion 20 through the crossover distribution unit 30, and the plurality of fiber optic subunits 40 of the second cable units 21 in the second cable portion 20 are bundled into the plurality of first cable units 11 of the first cable portion 10 through the crossover distribution unit 30.

Figure 2:
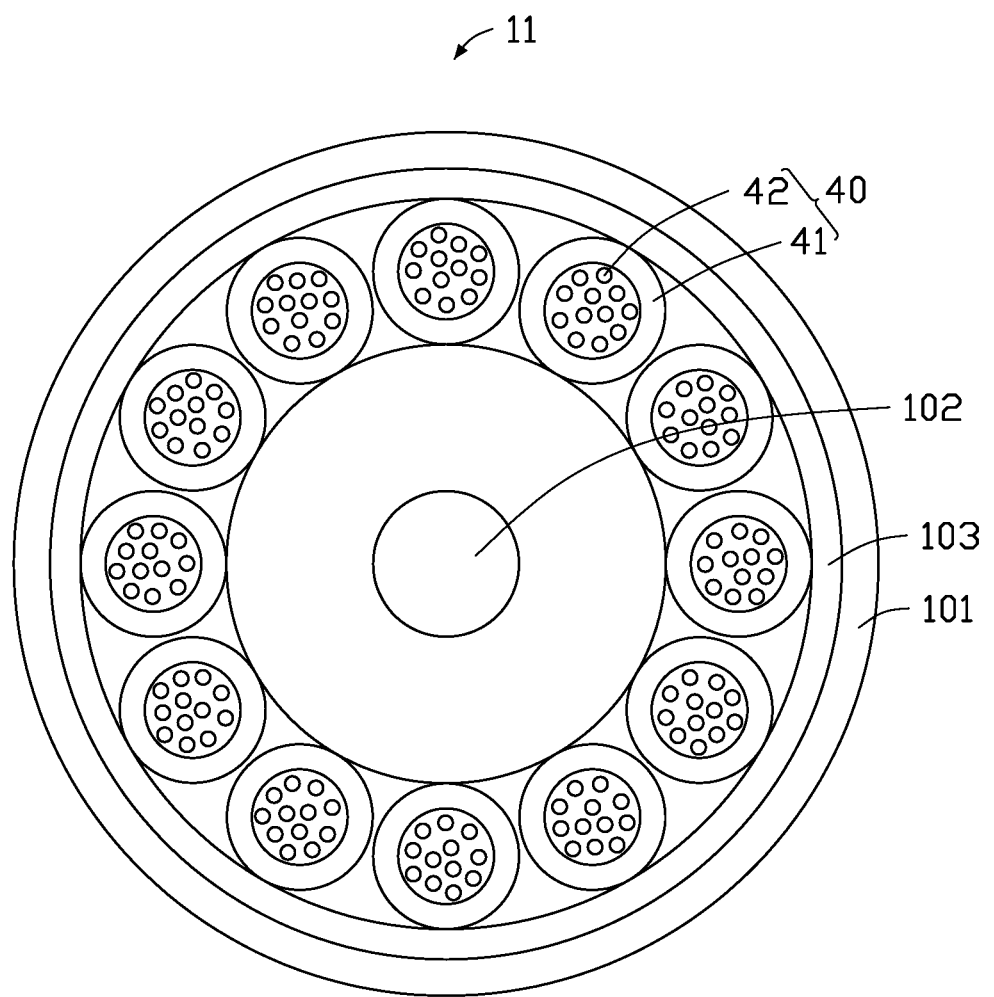
FIG. 2 is a diagram of a first cable portion of the fiber optic crossover cable in FIG. 1.

In at least one embodiment, referring to FIG. 2, each of the first cable units 11 includes an outer cover 101 made of flame resistant polyethylene (PE) and surrounding a central tensile body 102 located centrally within the outer casing 101. The plurality of fiber optic subunits 40 are arranged surrounding the central tensile body 102. A Kevlar fabric layer 103 is arranged within the outer casing 101 and surrounding the plurality of fiber optic subunits 40. In one embodiment, the first cable unit 11 further includes a protective layer (not shown) coated on an outer side of the central tensile body 102. It can be understood that in other embodiments, the protective layer may be omitted.

Each fiber optic subunit 40 includes a subunit jacket 41 and a plurality of optical fibers 42 housed within the subunit jacket 41. The subunit jacket 41 can be made of a flame resistant PE material. It can be understood that in other embodiments, the first cable portion 10 can also be other existing cable structures.

The fiber optic subunits 40 in each of the first cable units 11 are respectively bundled in the plurality of second cable units 21 through the crossover distribution unit 30 to couple to the corresponding switches 200. Likewise, the fiber optic subunits 40 in each of the second cable units 21 are respectively bundled in the plurality of first cable units 11 through the crossover distribution unit 30 to couple to the corresponding switches 200.

For example, the first switch group and the second switch each have eight switches 200, and each switch 200 has eight ports 210. The fiber optic crossover cable 100 is coupled between the first switch group and the second switch group. The first cable portion 10 includes eight first cable units 11, and the second cable portion 20 includes eight second cable units 21. The number of the fiber optic subunits 40 is 64, and each of the first cable units 11 and each of the second cable units 21 is coupled to a corresponding switch 200. The fiber optic crossover cable 100 can coupled the fiber optic subunits 40 of each switch 200 in the first switch group with the eight switches 200 in the second switch group, and simultaneously couple the fiber optic subunits 40 of each switch 200 in the second switch group with the eight switches 200 in the first switch group.

Figure 3:
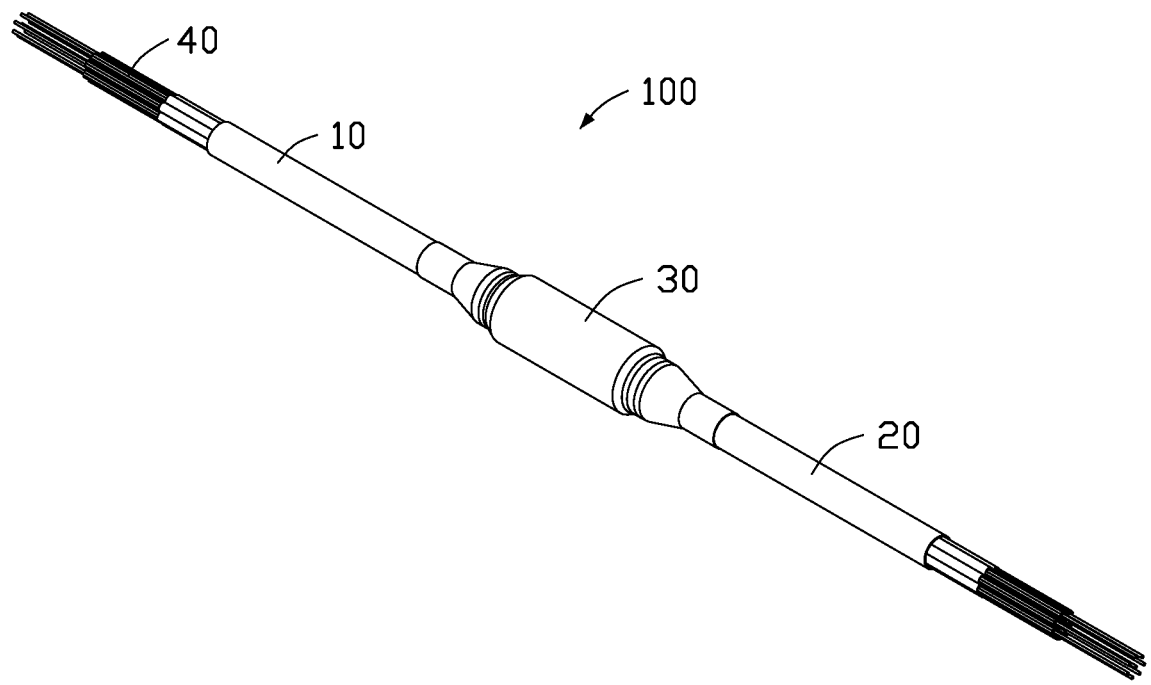
FIG. 3 is an isometric view of a second embodiment of a fiber optic crossover cable.
Figure 4:
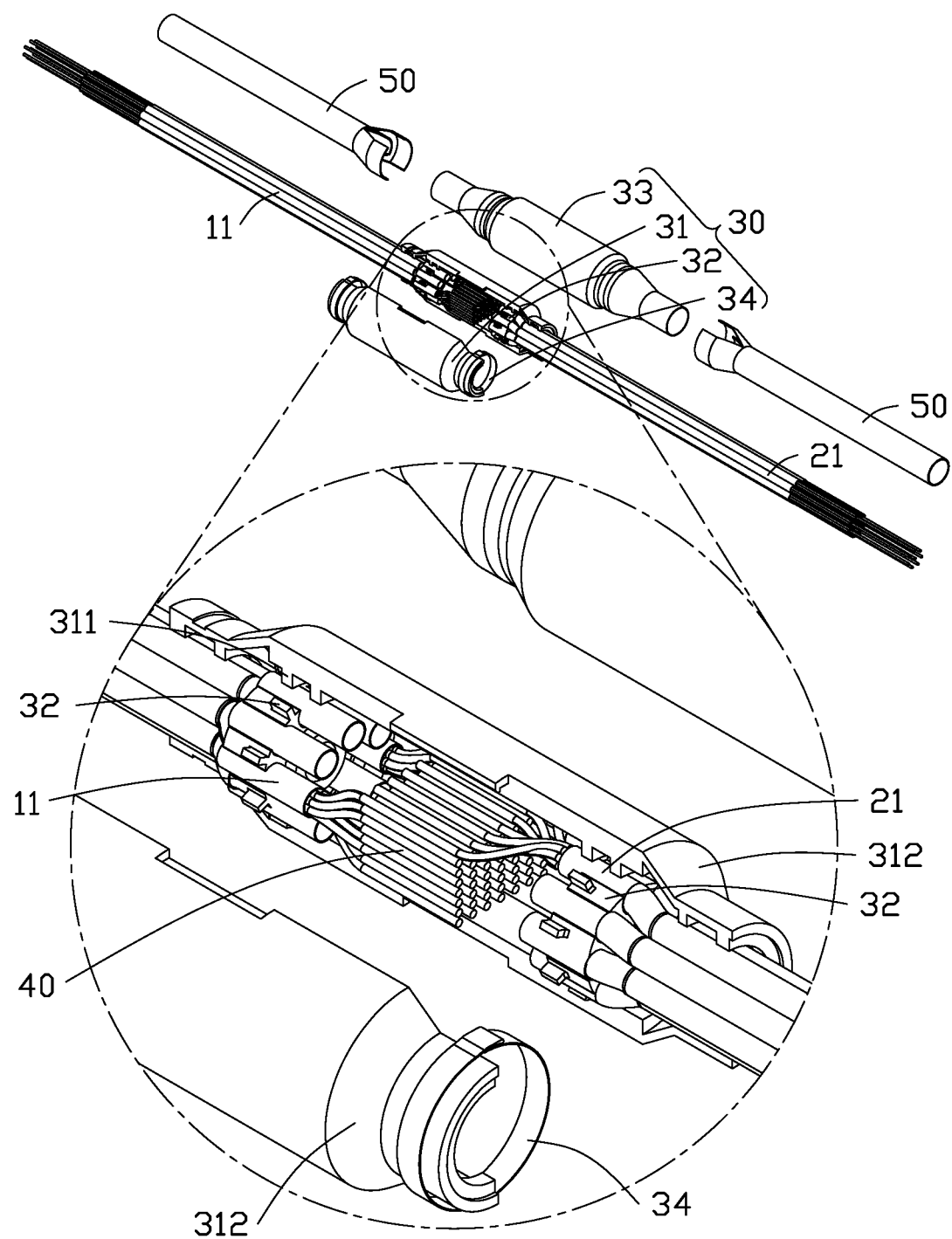
FIG. 4 is an exploded view of the fiber optic crossover cable in FIG. 3.
Figure 5:
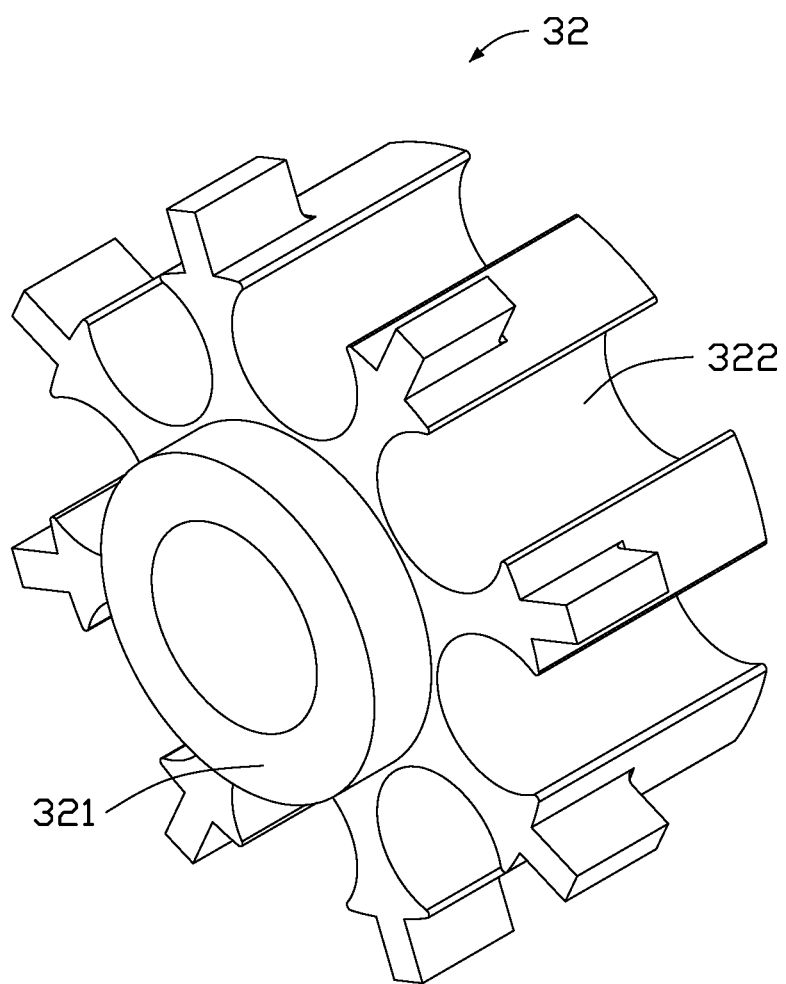
FIG. 5 is an isometric view of a bracket of the fiber optic crossover cable in FIG. 4.

FIGS. 3-5 show a second embodiment of a fiber optic crossover cable 100. The same reference numerals are used for the same elements shown in the first embodiment.

Similar to the first embodiment, the fiber optic crossover cable 100 includes a first cable portion 10, a second cable portion 20, a crossover distribution unit 30 disposed between the first cable portion 10 and the second cable portion 20, and a plurality of fiber optic subunits 40. The first cable portion 10 includes an M number of first cable units 11, and each of the first cable units 11 bundles together an N number of fiber optic subunits 40. The second cable portion 20 includes an N number of second cable units 21, and each of the second cable units 21 bundles together an M number of fiber optic subunits 40. The first cable portion 10 and the second cable portion 20 extend to the crossover distribution unit 30, and the plurality of fiber optic subunits 40 extend from the first cable portion 10 and the second cable portion 20. The plurality of fiber optic subunits 40 are arranged in the crossover distribution unit 30, such that the N number of fiber optic subunits 40 in each first cable unit 11 are respectively bundled into the N number of second cable units 21, and the M number of fiber optic subunits 40 in each second cable unit 21 are respectively bundled into the M number of first cable units 11.

The fiber optic crossover cable 100 further includes two cable jackets 50 respectively sleeved over the first cable portion 10 and the second cable portion 20 to contain the M number of first cable units 11 and the N number of second cable units 21 within a single cable.

Referring to FIG. 4, in the second embodiment, the plurality of fiber optic subunits 40 are arranged in the crossover distribution unit 30 in an M number of rows and an N number of columns. For ease of understanding, this embodiment and subsequent embodiments are merely illustrative of a portion of the fiber optic subunits 40.

The crossover distribution unit 30 includes a housing 31, two brackets 32 received in the housing 31, and a telescopic cover 33 covering the housing 31.

A substantially circular cavity is defined in the housing 31, and two ends of an inner wall of the housing 31 each include a latching ridge 311. The two brackets 32 are respectively latched with the two latching ridges 311, and the two brackets 32 respectively support and position the first cable units 11 and the second cable units 21.

Each of the brackets 32 has a disk shape and includes an annular portion 321 and a plurality of latching portions 322 arranged around an outer periphery of the annular portion 321. A bottom surface of each of the latching portions 322 is circular arc-shaped.

In the second embodiment, the housing 31 includes two detachably coupled housing portions 312. The crossover distribution unit 30 further includes two cable ties 34 that are respectively located at opposite ends of the housing 31 to couple together the two housing portions 312.

The telescopic cover 33 protects the crossover distribution unit 30. It will be understood that in other embodiments, the telescopic outer cover 33 may be omitted.

In at least one embodiment, each of the first cable units 11 and each of the second cable units 21 include a jacket (not shown) to contain the fiber optic subunits 40 therein.

In at least one embodiment, one or more of the two cable jackets 50, the first cable units 11, and the second cable units 21 may be composed of a woven mesh structure, but is not limited thereto.

In at least one embodiment, the first cable units 11 or the second cable units 21 may be replaced by the structure shown in FIG. 2.

Figure 6:
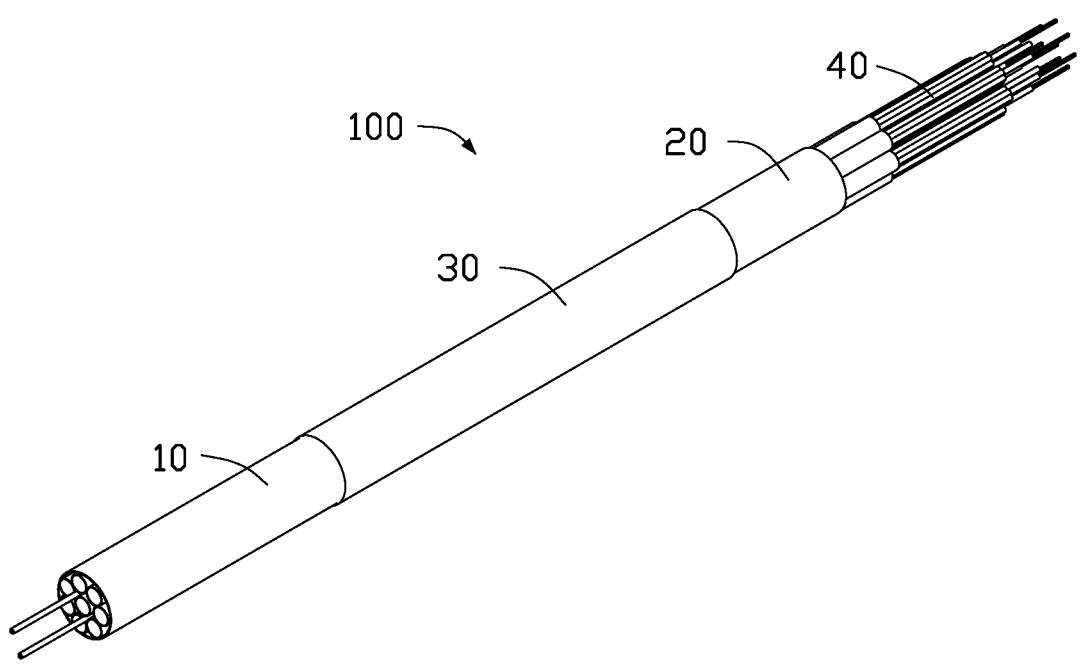
FIG. 6 is an isometric view of a third embodiment of a fiber optic crossover cable.
Figure 7:
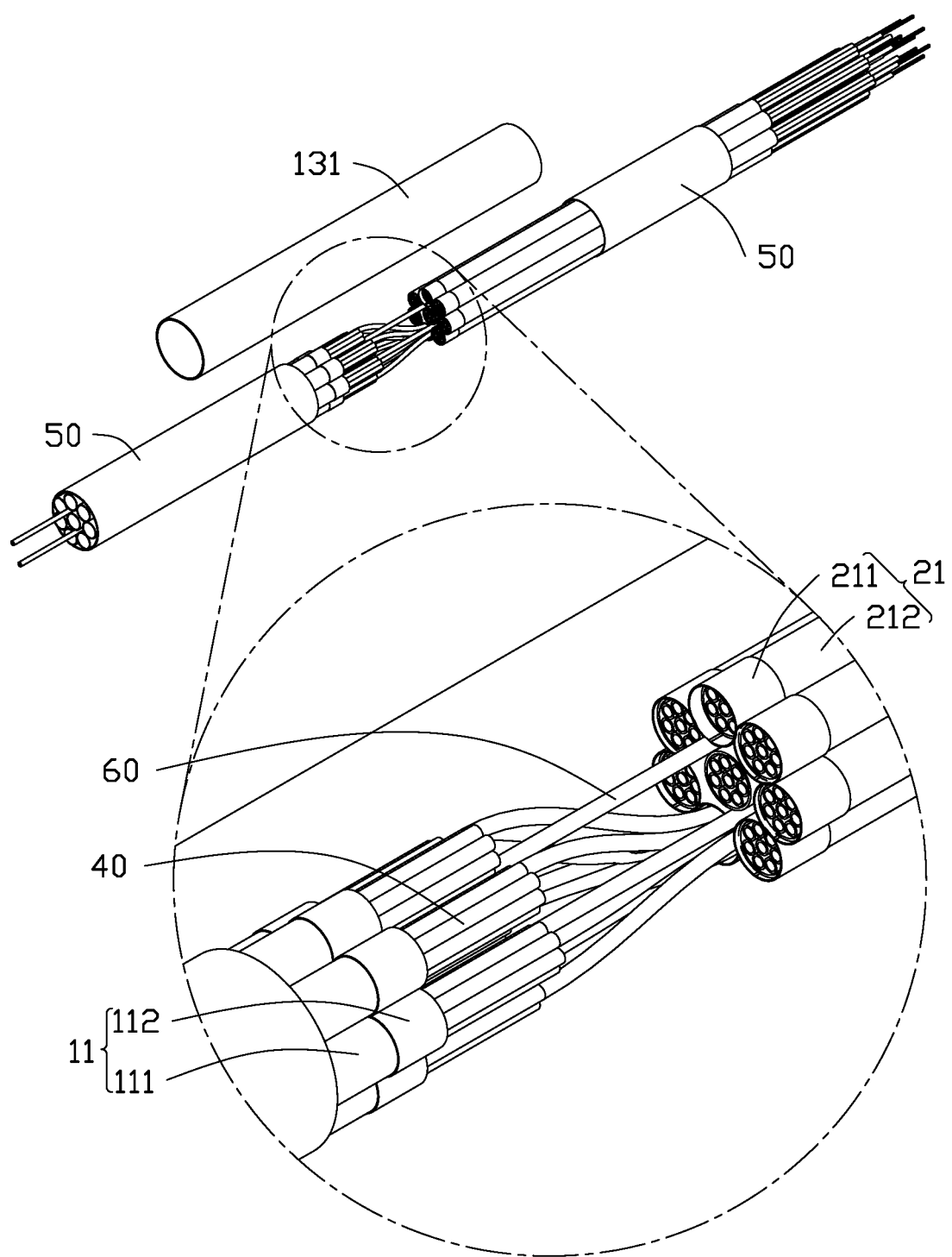
FIG. 7 is an exploded view of the fiber optic crossover cable in FIG. 6.
Figure 8:
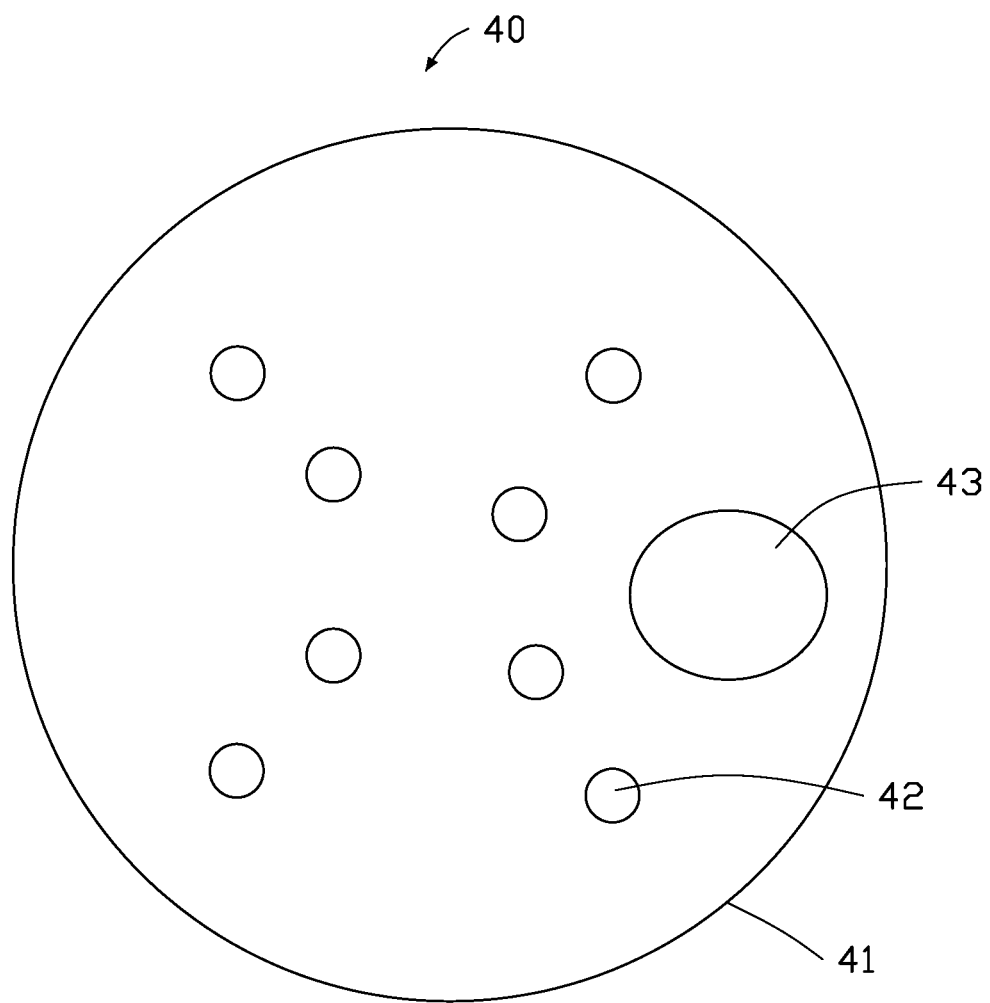
FIG. 8 is a cross-sectional diagram of a fiber optic subunit in FIG. 7.

FIGS. 6-8 show a third embodiment of a fiber optic crossover cable 100, and the same reference numerals are used for the same elements shown in the first and second embodiments. The portions of the third embodiment that are different from the second embodiment will be described below.

In the third embodiment, each first cable unit 11 includes a first jacket 111 and a first reinforcement sheath 112. The first reinforcement sheath 112 is located at an end of the first jacket 111. The first jacket 111 bundles together the plurality of fiber optic subunits 40 into a single cable, and the first reinforcing sheath 112 is configured to thicken the end of the first cable units 11. Similarly, the second cable unit 21 includes a second jacket 211 and a second reinforcing sheath 212. The second reinforcing sheath 212 is located at an end of the second jacket 211. The second jacket 211 bundles together the plurality of fiber optic subunits 40 into a single cable.

Two cable jackets 50 are respectively sleeved over the first cable portion 10 and the second cable portion 20. The cable jackets 50 are substantially hollow columnar-shaped.

The fiber optic crossover cable 100 further includes one or more cable strengthening members 60 that extends in the first cable portion 10, the crossover distribution unit 30, and the second cable portion 20 to provide strength support for the fiber optic crossover cable 100 and prevent damage to the optical fibers. The cable strengthening member 60 may be a Kevlar load-bearing cable. In one embodiment, the cable strengthening member 60 is located between the M number of first cable units 11 and the N number of second cable units 21. It will be appreciated that in other embodiments, the cable strengthening member 60 may be omitted.

The crossover distribution unit 30 includes a distribution portion sheath 131. The distribution portion sheath 131 is substantially hollow columnar-shaped, and two ends of the distribution portion sheath 131 are respectively sleeved over an end portion of the first cable portion 10 and an end portion of the second cable portion 20 and partially covered over the two cable jackets 50. The crossover distribution unit 30 further includes a telescopic cover (not shown), and the telescopic cover is covered on an outer side of the distribution portion sheath 131.

It will be appreciated that in other embodiments, lengths of the plurality of first cable units 11 or of the plurality of second cable units 21 extending into the crossover distribution unit 30 may be different.

In at least one embodiment, one or more of the two cable jackets 50, the first jacket 111, and the second jacket 211 may be composed of a woven mesh structure, but is not limited thereto.

In at least one embodiment, the first cable units 11 or the second cable units 21 may be replaced by the structures shown in FIG. 2.

Referring to FIG. 8, each of the fiber optic subunits 40 includes a subunit jacket 41, a plurality of optical fibers 42 housed within the subunit jacket 41, and Kevlar 43. It can be understood that in other embodiments, the number of the optical fibers 42 may be one or more than one, and the Kevlar 43 may be omitted.

Figure 9:
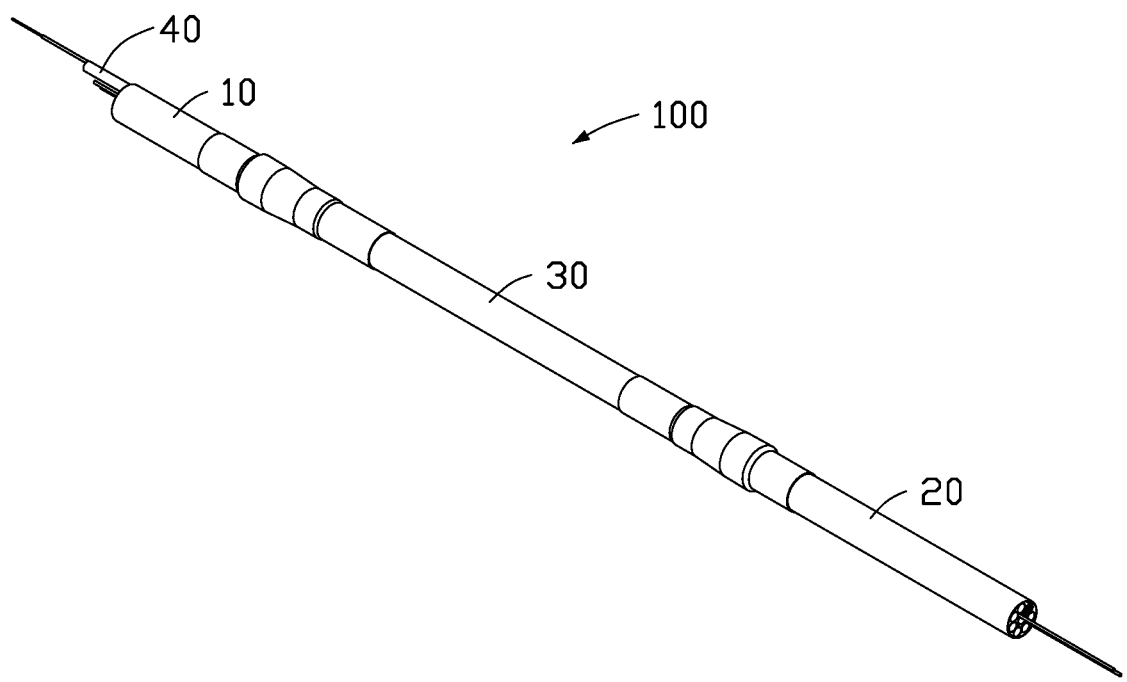
FIG. 9 is an isometric view of a fourth embodiment of a fiber optic crossover cable.
Figure 10:
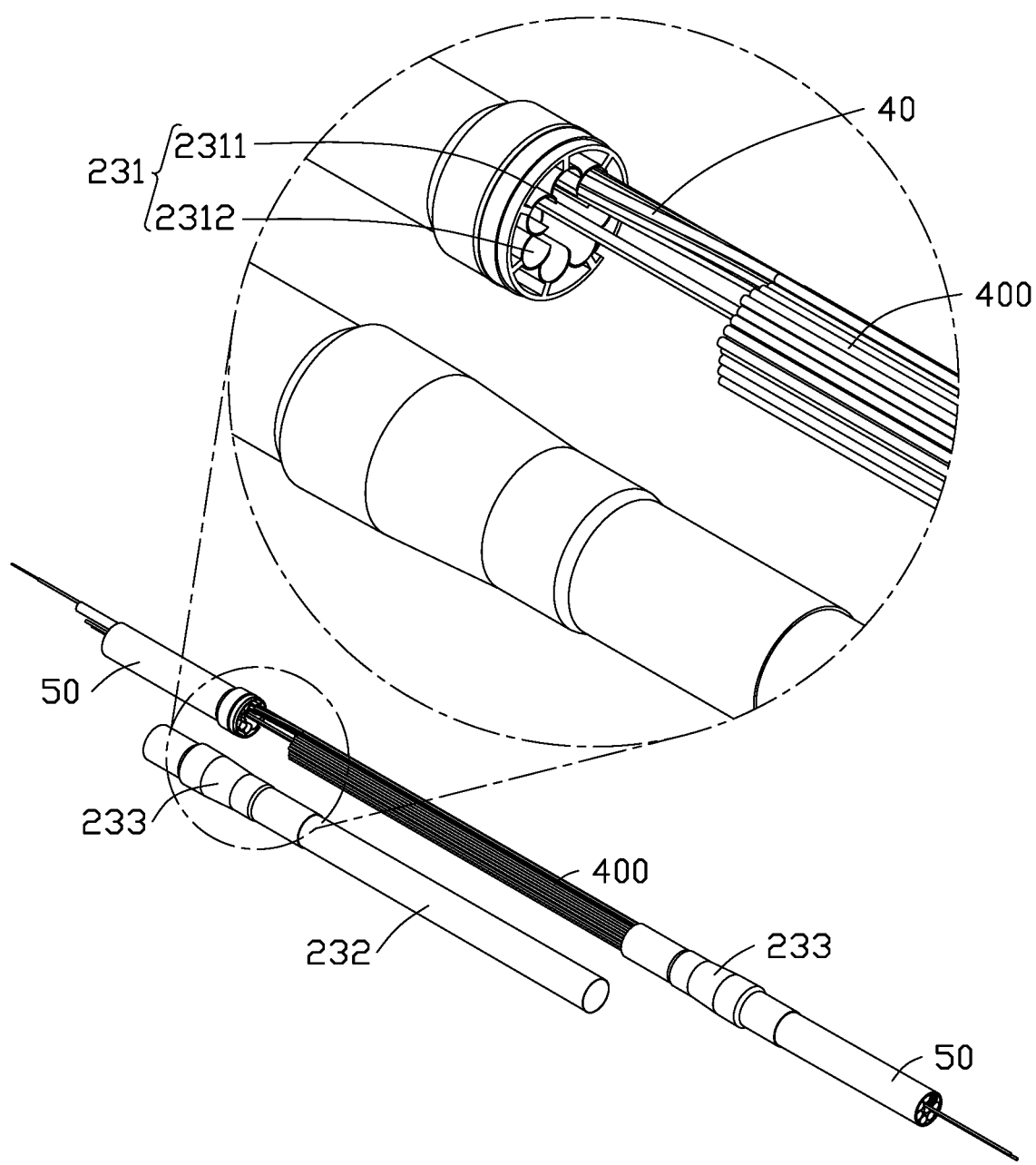
FIG. 10 is an exploded view of the fiber optic crossover cable in FIG. 9.

FIGS. 9-10 show a fourth embodiment of a fiber optic crossover cable 100, and the same reference numerals are used for the same elements as shown in the previous embodiments. The differences between the fourth embodiment and the second embodiment will be described below.

In the fourth embodiment, the plurality of fiber optic subunits 40 are bundled together in the crossover distribution unit 30 to form a fiber optic subunit assembly 400. The crossover distribution unit 30 includes two brackets 231, an extension sheath 232, and two branch sheaths 233.

The two brackets 231 are respectively disposed at an end of the first cable portion 10 and an end of the second cable portion 20 and are respectively received in the two cable jackets 50 to support and position the first cable units 11 and the second cable units 21. Each of the brackets 231 includes an annular portion 2311 and a plurality of latching portions 2312 arranged around an inner periphery of the annular portion 2311. A bottom surface of each of the latching portions 2312 is substantially circular arc-shaped.

The extension sheath 232 covers the fiber optic subunit assembly 400. The extension sheath 232 is substantially hollow columnar-shaped, and two ends of the extension sheath 232 are respectively spaced apart from the two cable jackets 50.

Two branch sheaths 233 are respectively disposed at two intersection points of the fiber optic subunits 40. One of the branch sheaths 233 is sleeved over an end of the optical cable jacket 50 of the first cable portion 10 and an end of the extension sheath 232. The other branch sheath 233 is sleeved over an end of the cable jacket 50 of the second cable portion 20 and the other end of the extension sheath 232.

Figure 11:
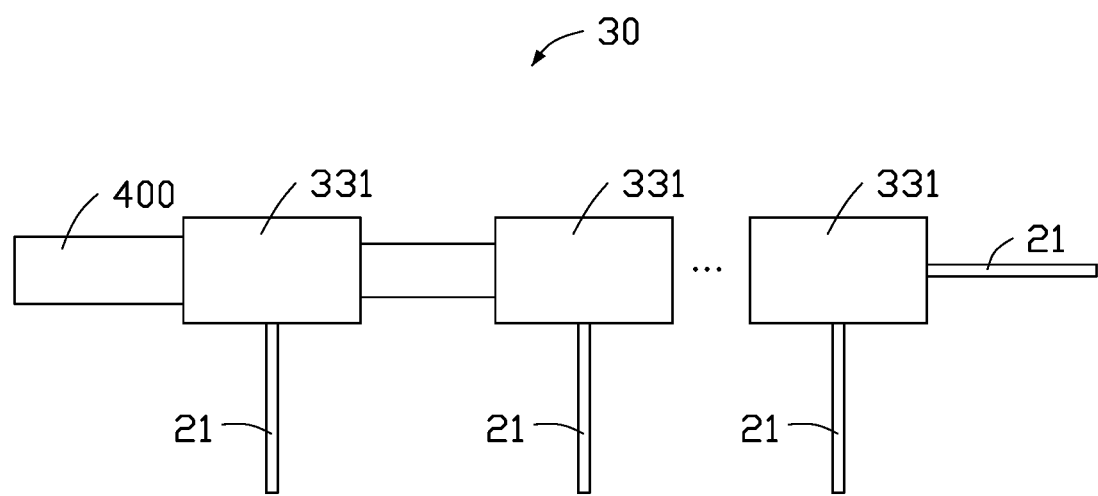
FIG. 11 is a fifth embodiment of a crossover distribution unit.

FIG. 11 shows a schematic view of a fifth embodiment of a crossover distribution unit 30. The crossover distribution unit 30 includes one or more branching devices 331. The plurality of fiber optic subunits 40 are bundled into a fiber optic subunit assembly 400 in the crossover distribution unit 30, and the fiber optic subunits 40 of the fiber optic subunit assembly 400 are divided into the plurality of second cable units 21 by one or more branching devices 331. The second cable units 21 are coupled to the corresponding switches 200 (not shown).

Figure 12:
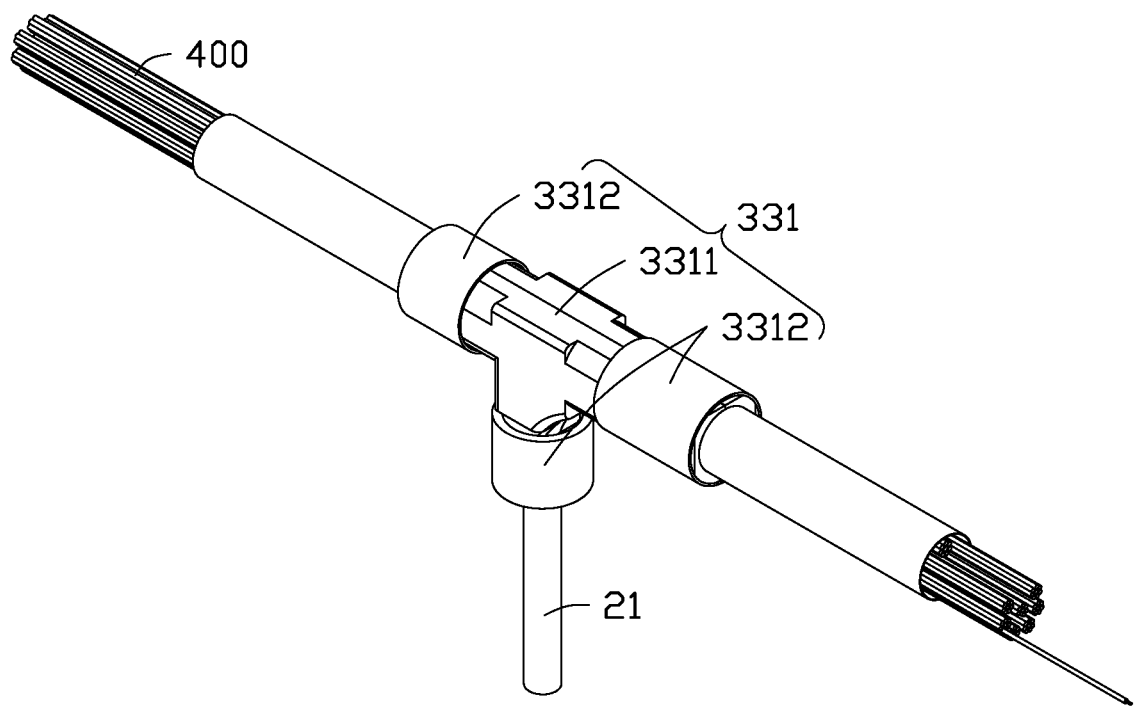
FIG. 12 is an isometric view of a branching device of the crossover distribution unit in FIG. 11.
Figure 13:
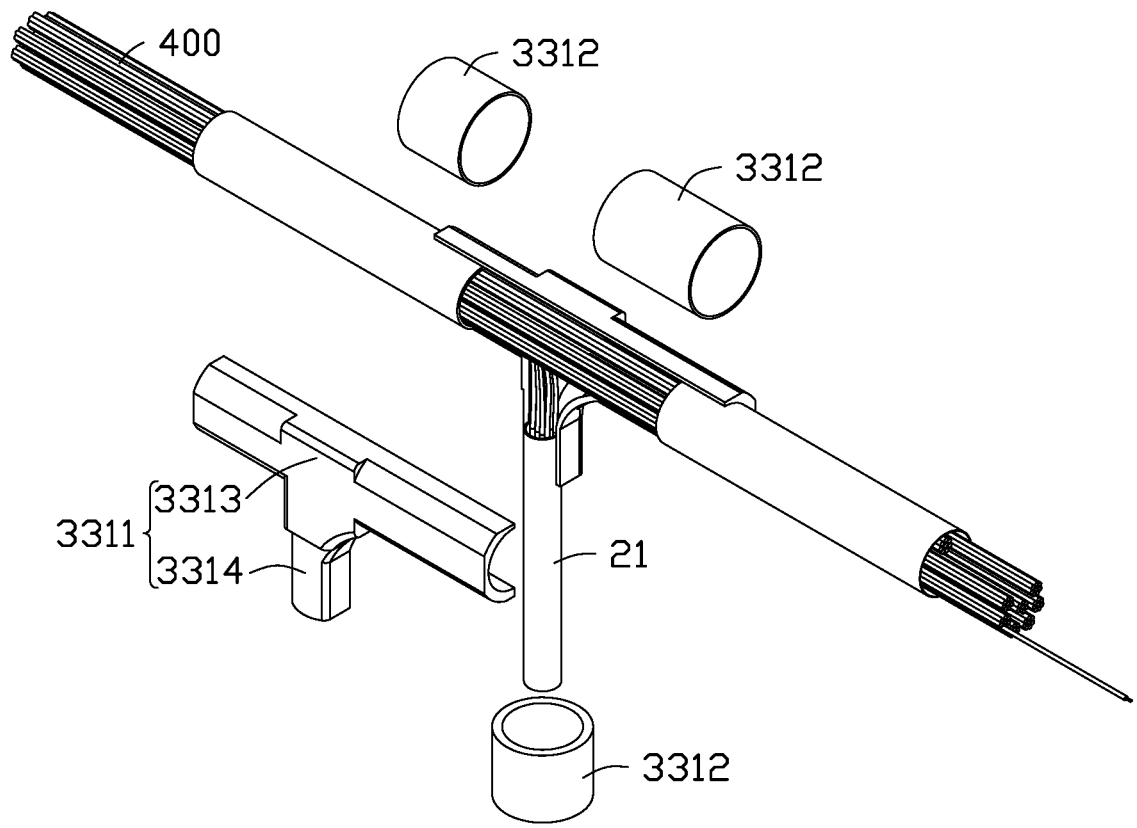
FIG. 13 is an exploded view of the branching device in FIG. 12.

FIGS. 12-13 show the branching device 331. The branching device 331 includes a branch housing 3311 and three connecting rings 3312. An inner cavity of the branch housing 3311 has a substantially T-shaped cross-section and includes a main portion 3313 and a branch portion 3314. The main portion 3313 and the branch portion 3314 are substantially perpendicularly coupled together. The main portion 3313 receives the fiber optic subunit assembly 400, and the branch portion 3314 is coupled to the second cable unit 21. Each of the second cable units 21 bundles together a plurality of the fiber optic subunits 40 of the fiber optic subunit assembly 400. The number of the second cable units 21 can be set as desired.

Two connecting rings 3312 are respectively located at two sides of the main portion 3313, and the third connecting ring 3312 is sleeved on the branching portion 3314 to couple the branch housing 3311 to the second cable unit 21.

Figure 14:
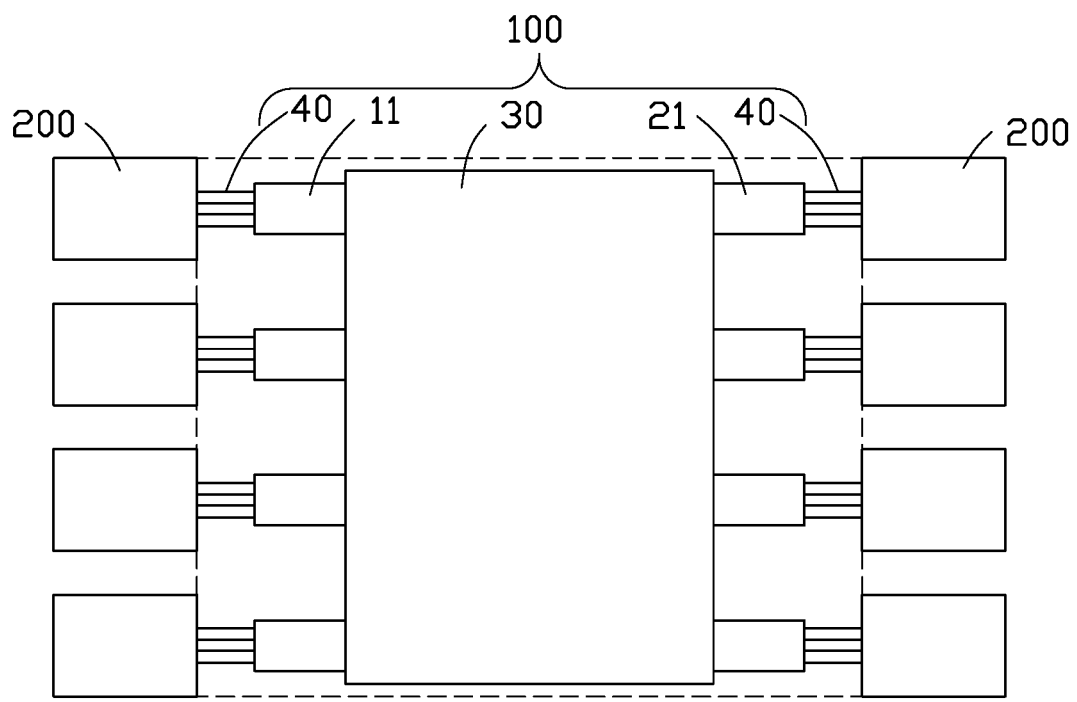
FIG. 14 is a diagram showing an operation principle of the fiber optic crossover cable.

Referring to FIG. 14, an operation principle of the fiber optic crossover cable 100 will be described below. The fiber optic crossover cable 100 is coupled between a first switch group and a second switch group. The first switch group and the second switch group each include four switches 200. Taking a switch 200 of the first switch group as an example, the switch 200 has four channels for generating signals. The switch 200 is coupled to the first cable unit 11 of the fiber crossover cable 100, and the first cable unit 11 bundles together four fiber optic subunits 40. The four fiber optic subunits 40 are rearranged in the crossover distribution unit 30. The four fiber optic subunits 40 are respectively divided into the four second cable units 21, and the four second cable units 21 are respectively coupled to the four switches 200. Therefore, the signals in the four channels of one switch 200 in the first switch group can be transmitted respectively to the four switches 200 of the second switch group through the fiber crossover cable 100. Since the optical signals of the switch 200 do not need to transmit through any gaps to the second set of switches 200, signal loss in the optical fiber is negligible.

The embodiments described above are based on the Clos principle design, but are not limited thereto, and can also be customized according to user requirements.

In the related art, an 8 by 8 switch using a traditional adapter cabinet requires two MPO backplanes and one cabinet. For the sixteen switches, 128 MPO connectors are required, and a connection loss of each switch is about 0.8 dB.

Using a modified adapter cabinet, one MPO backplane and one cabinet are required for the sixteen switches. The sixteen switches require 128 MPO connectors, and the connection loss of each two switches is about 0.4 dB. Therefore, using the modified adapter cabinet to connect the switches is costly and has a large connection loss.

By using the fiber optic crossover cable 100, it is not necessary to set up the MPO backplane and the cabinet. Only 128 MPO connectors are required, and the connection loss is negligible.

Therefore, the optical fiber cross-over cable 100 disclosed in the present disclosure can establish communication among the switches 200. The cost is low, and the connection loss is negligible. Furthermore, the above-disclosed optical fiber cross-over cable 100 can reduce a required transmission power of the switches, thereby reducing the overall power of the data center and saving energy.

It can be understood that in other embodiments, the structure of the crossover distribution unit 30 can be set according to requirements. For example, the brackets 32 may be omitted, as long as the plurality of fiber optic subunits 40 can be arranged accordingly.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A fiber optic crossover cable for achieving communication among switches, the fiber optic crossover cable comprising:
   a first cable portion;
   a second cable portion;
   a crossover distribution unit arranged between the first cable portion and the second cable portion; and
   a plurality of fiber optic subunits; wherein:
   each of the plurality of fiber optic subunits comprises at least one optical fiber;
   each fiber optic subunit comprises two end portions configured to respectively pass through one first cable portion and one second cable portion, and each of the two end portions respectively couples to a port of a switch;
   the first cable portion comprises an M number of first cable units;
   each of the M number of first cable units comprises an N number of the fiber optic subunits;
   the second cable portion comprises an N number of second cable units;
   each of the N number of second cable units comprises an M number of the fiber optic subunits;
   M and N are each an integer number greater than or equal to 1;
   the M number of first cable units and the N number of second cable units are arranged in the crossover distribution unit;
   the N number of fiber optic subunits of the M number of first cable units respectively extend to the N number of second cable units; and
   the M number of fiber optic subunits of the N number of second cable units respectively extend to the M number of first cable units.

2. The fiber optic crossover cable of claim 1, wherein:
   the crossover distribution unit comprises a housing and two brackets received in the housing;
   the housing comprises two latching ridges respectively arranged at two ends of an inner wall of the housing;
   the two brackets respectively latch with the two latching ridges and respectively position the first cable unit and the second cable unit.

3. The fiber optic crossover cable of claim 2, wherein:
   Each bracket comprises an annular portion and a plurality of latching portions arranged around an outer periphery of the annular portion;
   a bottom surface of each latching portion is circular arc-shaped.

4. The fiber optic crossover cable of claim 2, wherein:
   the housing comprises two detachable housing portions;
   the crossover distribution unit further comprises two cable ties and a telescopic cover;
   the telescopic cover covers the housing;
   the two cable ties are respectively arranged at two ends of the housing and couple the two housing portions together.

5. The fiber optic crossover cable of claim 1 further comprising at least one cable strengthening member, wherein:
   the at least one cable strengthening member extends within the first cable portion, the crossover distribution unit, and the second cable portion.

6. The fiber optic crossover cable of claim 1, wherein:
   each fiber optic subunit further comprises a subunit jacket;
   the at least one optical fiber of each fiber optic subunit is received within the subunit jacket.

7. The fiber optic crossover cable of claim 1, wherein:
   each first cable unit comprises an outer cover and a central tensile body;
   a material of the outer cover is polyethylene;
   the plurality of fiber optic subunits surround the central tensile body;
   the first cable unit further comprises a Kevlar fabric layer;
   the Kevlar fabric layer covers the plurality of fiber optic subunits.

8. The fiber optic crossover cable of claim 1 further comprising two cable jackets, wherein:
   the two cable jackets are respectively sleeved on the first cable unit and the second cable unit.

9. The fiber optic crossover cable of claim 8, wherein:
   each first cable unit comprises a first jacket covering the N number of fiber optic subunits; and
   each second cable unit comprises a second jacket covering the M number of fiber optic subunits.

10. The fiber optic crossover cable of claim 9, wherein:
    at least one of the two cable jackets, the first jacket, and the second jacket is made of woven mesh material.

11. The fiber optic crossover cable of claim 9, wherein:
the crossover distribution unit comprises a distribution portion sheath;
the distribution portion sheath is hollow columnar;
two ends of the distribution portion sheath are respectively sleeved over the end portion of the first cable portion and an end portion of the second cable portion;
the distribution portion sheath partially covers the two cable jackets.

12. The fiber optic crossover cable of claim 10, wherein:
the first cable unit further comprises a first reinforcing sheath arranged on an end of the first jacket; and
the second cable unit further comprises a second reinforcing sheath arranged on an end of the second jacket.

13. The fiber optic crossover cable of claim 8, wherein:
the plurality of fiber optic subunits are bundled together in the crossover distribution unit to form a fiber optic subunit assembly.

14. The fiber optic crossover cable of claim 13, wherein:
the crossover distribution unit comprises two brackets, an extension sheath, and two branch sheaths;
the two brackets are respectively arranged on an end portion of the first cable portion and the second cable portion and are respectively received in the two cable jackets;
the extension sheath covers the fiber optic subunit assembly;
two ends of the extension sheath are respectively spaced from the two cable jackets;
the two branch sheaths are respectively arranged at two intersection points of the fiber optic subunits;
one of the two branch sheaths is sleeved over the end portion of the cable jacket of the first cable portion and one end portion of the extension sheath;
the other one of the two branch sheaths is sleeved over the end portion of the cable jacket of the second cable portion and a second end portion of the extension sheath.

15. The fiber optic crossover cable of claim 14, wherein:
each bracket comprises an annular portion and a plurality of latching portions;
a bottom surface of each latching portion is circular arc-shaped;
the plurality of latching portions are arranged around an inner periphery of the annular portion.

16. The fiber optic crossover cable of claim 13, wherein:
the crossover distribution unit comprises at least one branching device;
the fiber optic subunits of the fiber optic subunit assembly are divided into the plurality of second cable units by at least one branching device;
each of the second cable units is coupled to a corresponding one of the switches.

17. The fiber optic crossover cable of claim 16, wherein:
the branching device comprises a branch housing and three connecting rings;
the branch housing comprises a main portion and a branch portion perpendicularly coupled to the main portion;
the main portion receives the fiber optic subunit assembly;
the branch portion fixes the plurality of second cable units.

18. A fiber optic crossover cable for achieving communication among switches, the fiber optic crossover cable comprising:
a first cable portion;
a second cable portion;
a crossover distribution unit arranged between the first cable portion and the second cable portion; and
a plurality of fiber optic subunits; wherein:
each of the plurality of fiber optic subunits comprises at least one optical fiber;
each fiber optic subunit comprises two end portions configured to respectively pass through one first cable portion and one second cable portion, and each of the two end portions respectively couples to a port of a switch;
the first cable portion comprises an M number of first cable units;
each of the M number of first cable units comprises an N number of the fiber optic subunits;
the second cable portion comprises an N number of second cable units;
each of the N number of second cable units comprises an M number of the fiber optic subunits;
M and N are each an integer number greater than or equal to 1;
the M number of first cable units and the N number of second cable units are arranged in the crossover distribution unit and arranged in an M number of rows and an N number of columns;
the N number of fiber optic subunits of the M number of first cable units respectively extend to the N number of second cable units; and
the M number of fiber optic subunits of the N number of second cable units respectively extend to the M number of first cable units.

\* \* \* \* \*